(12) United States Patent
Witzmann et al.

(10) Patent No.: US 12,441,648 B2
(45) Date of Patent: Oct. 14, 2025

(54) METHOD AND APPARATUS FOR PRODUCING HOLLOW GLASS BODY PRODUCTS, AND HOLLOW GLASS BODY PRODUCTS AND THEIR USE

(71) Applicant: Schott AG, Mainz (DE)

(72) Inventors: André Witzmann, Waldershof (DE); Fabian Wagner, Mainz (DE)

(73) Assignee: Schott AG, Mainz (DE)

( * ) Notice: Subject to any disclaimer, the term of this patent is extended or adjusted under 35 U.S.C. 154(b) by 803 days.

(21) Appl. No.: 16/392,117

(22) Filed: Apr. 23, 2019

(65) Prior Publication Data
US 2019/0322565 A1 Oct. 24, 2019

(30) Foreign Application Priority Data

Apr. 24, 2018 (DE) ..................... 10 2018 109 820.0

(51) Int. Cl.
*C03B 33/085* (2006.01)
*B01L 3/00* (2006.01)
*C03B 33/10* (2006.01)

(52) U.S. Cl.
CPC ...... *C03B 33/0855* (2013.01); *B01L 3/50851* (2013.01); *C03B 33/102* (2013.01)

(58) Field of Classification Search
CPC .......... B01L 3/5082; B01L 2300/0858; C03B 33/0222
USPC .............................................. 422/558, 549
See application file for complete search history.

(56) References Cited

U.S. PATENT DOCUMENTS

| 4,516,998 | A | 5/1985 | Ritt et al. |
| 6,055,829 | A * | 5/2000 | Witzmann .......... C03B 33/0955 65/56 |
| 2004/0007280 | A1 | 1/2004 | Rausch et al. |
| 2015/0034612 | A1 | 2/2015 | Hosseini et al. |
| 2015/0136743 | A1 | 5/2015 | Hosseini |
| 2015/0140735 | A1 | 5/2015 | Hosseini |
| 2016/0009586 | A1 * | 1/2016 | Bookbinder ............ C03B 33/06 65/112 |
| 2018/0134606 | A1 | 5/2018 | Wagner et al. |

FOREIGN PATENT DOCUMENTS

| DE | 1114992 B | 5/1966 |
| DE | 10 2015 116 848 A1 | 4/2017 |
| WO | 2017/009149 A1 | 1/2017 |

* cited by examiner

*Primary Examiner* — Natalia Levkovich
(74) *Attorney, Agent, or Firm* — TAYLOR & EDELSTEIN, PC

(57) ABSTRACT

A method and apparatus is provided for producing a hollow glass body product including a hollow glass body having an outer surface with a first end portion and a second end portion, the first end portion being sealed by a first bottom and the second end portion being sealed by a second bottom. A plurality of spaced apart filamentary defects are provided in the outer surface and at least part of the filamentary defects form open passages connecting an interior of the hollow glass body to the outer surface thereof. Each individual passage has a diameter in the micrometer range between more than 0 micrometers and less than 50 micrometers. A plurality of the micrometer range-sized open passages provides a total cross-sectional area sufficiently large for venting and/or pressure equalization.

6 Claims, 4 Drawing Sheets

METHOD AND APPARATUS FOR PRODUCING HOLLOW GLASS BODY PRODUCTS, AND HOLLOW GLASS BODY PRODUCTS AND THEIR USE

BACKGROUND OF THE INVENTION

1. Field of the Invention

The invention relates to a method for producing hollow glass body products, to an apparatus for producing hollow glass body products, to a hollow glass body product, and to the use of such hollow glass body products. The invention also relates to hollow glass body products, in particular at least predominantly cylindrical hollow glass body products, such as glass tubes or glass tube sections, and also to hollow glass articles produced from the hollow glass body product by further processing, such as glass tube vials, glass ampoules, glass cartridges, or glass syringes.

2. Description of the Related Art

Hollow glass body products refer to both hollow glass body products finished for use and hollow glass body precursors that may or have to be processed further, for example hollow glass body sections. Furthermore, such hollow glass body products or glass containers may have circular or non-circular cross-sectional shapes, elongated hollow bodies of constant or variable diameter along their longitudinal extent.

In the tube manufacturing process, for example for the production of primary packaging for pharmaceutical products, individual tubes are usually produced from a continuous strand by brittle fracturing. A drawback of the conventional brittle fracturing is that glass splinters or glass particles may be generated, which might even get into the interior of the tube.

Such splinters or glass particles can be avoided by a separation process in a thermally softened state, also referred to as heat-soft separation process below.

DE 44 44 547 C2 discloses a method for heat-soft separation of glass tubes or glass panels by softening the glass tube or glass panel at the separation point, reducing the wall thickness in the softened area by drawing, and then separating by further heating. In the case of thin-walled tubes or panels having a wall thickness of not more than 0.2 mm, the glass is softened over a width of not more than 0.4 mm, the softened area is brought to a wall thickness of not more than 0.05 mm by drawing, the drawing length corresponding to at least five times the original wall thickness, and then separation is accomplished in the drawn area by further heating.

DE 100 47 850 A1 specifies a method that can be used to separate glass tubes from a continuously moving glass strand without causing splinters that would subsequently have to be removed by a washing process. In the method for severing lengths of tube glass, a glass strand is drawn, a heating device is moved together with the glass strand while being directed to the region of a desired separation point, the glass strand is stretched in the region of the desired separation point, a separating device is moved together with the glass strand, and the separating device is operated to sever the glass strand at the desired separation point.

Since in the continuous hollow glass body drawing process, the separation process takes place at a glass temperature of about 150° C. and 350° C., a negative pressure is produced in the hollow glass body when being cooled to room temperature. This negative pressure in the hollow glass body may have a detrimental effect on the further processing, since conventional processes are not designed for negative pressure in a hollow glass body interior. In particular, opening of a hollow glass body with a negative pressure inside implies a high risk of particle ingress into the interior of the glass body and may hinder the shaping under certain circumstances.

According to the prior art, a vent hole is introduced into the hot glass tube for pressure equalization, using a laser or, conventionally, using a burner. This prevents a negative pressure from being generated in the tube volume. This is disclosed in EP 1 369 389 A2, for example.

In the manufacture of glass tubes, particle-free sealing can usually not be guaranteed. Besides open tube ends, there exists the Densocan® version in which the tube ends are closed and pressure equalization of the tube's interior is achieved by a lateral vent opening having a diameter of about 1 to 3 mm or 1.5 to 3.5 mm. Particles, e.g. impurities, can be introduced through this vent opening in particular during transport of the otherwise hermetically sealed tube. Moreover, the process of producing a vent hole implies a risk of producing particles inside the tube.

So, although such vent openings allow for further processing of the tubes without the adverse impact of a negative pressure within the tube, they may imply the drawback that the initially particle-free condition of the tube's interior is not guaranteed so that particle ingress cannot be entirely avoided.

There is thus the risk of generating glass particles when producing a vent opening per se, as well as the risk of particles of various types penetrating through such a vent opening.

SUMMARY OF THE INVENTION

Exemplary embodiments disclosed herein provide a method for producing a hollow glass body with a pressure equalization system and provide a hollow glass body with a pressure equalization system and with at least reduced particle load or even without particle load. It is intended to avoid the drawback that particles or splinters are generated when producing the hollow glass body and the pressure equalization system itself, and that particles or splinters can penetrate into the interior of the hollow body through the pressure equalization system itself. Consequently, both particle sources should be reliably excluded.

This is particularly important for the manufacturing process for primary packaging for pharmaceutical products as well as for primary packaging for pharmaceutical products per se.

In some exemplary embodiments, the method for producing a hollow glass body product according to the invention comprises the steps of:
  providing a hollow glass body having a wall and an outer surface;
  forming the hollow glass product so as to have a first end portion and a second end portion, the first end portion being sealed by a first bottom and the second end portion being sealed by a second bottom; and
  laser-based irradiating of the hollow glass body with focused laser radiation to produce a plurality of spaced apart filamentary defects in a predetermined arrangement pattern in the outer surface of at least the first end portion thereby generating a plurality of open passages connecting the interior of the hollow glass body to the outer surface thereof by at least part of the filamentary defects, wherein the diameter of the passages is sized to be between more than 0 and less than 50 micrometers, and wherein a plurality of the open passages provide gaseous communication to the interior.

The sealing of the ends for forming the hollow glass body product may be achieved prior to or else after the introducing of the passages using the laser. Also, one end may be sealed prior to the introducing of the passages and the other end after the introducing of the passages.

Thus, by introducing a sufficient number of passages, the method makes it possible to produce a total cross-sectional area that is sufficiently large for venting and/or pressure equalization.

Accordingly, exemplary embodiments of the hollow glass body product provided according to the invention comprises a hollow glass body having an outer surface with a first end portion and a second end portion, each of the end portions being sealed by a respective bottom, so the first end portion is sealed by a first bottom and the second end portion is sealed by a second bottom, wherein a plurality of spaced apart filamentary defects are provided in the outer surface and at least part of the filamentary defects form open passages connecting the interior of the hollow glass body to the outer surface thereof. Each individual passage has a diameter in the micrometer range, and a plurality of the micrometer range-sized open passages provide a total cross-sectional area sufficiently large for venting and/or pressure equalization. Typically, the hollow glass body product has a tubular shape, so it comes in the form of a tube that is closed at both ends.

By providing a sufficiently large cross-sectional area for venting or pressure equalization by a plurality of micrometer range-sized open passages or a multitude of micrometer range-sized open passages, it is possible to prevent the establishment or maintenance of an undesirable pressure differential between the interior and the exterior of the hollow glass body, in particular of a negative pressure in the interior of the hollow glass body.

It will be clear to a person skilled in the art how to determine the necessary number of open passages as defined by the filamentary defects on the basis of the cross section of the opening or diameter of an open passage and the rate of pressure equalization which depends on the application. Normally, rather small open passages will be sufficient for pressure equalization during the cooling and transporting of a hollow glass body over several hours.

Due to the small size of each open passage, the generation of particles, especially those with a critical size for penetration, can be prevented. Due to the small diameter of the open passages, no particles larger than the diameter of the passages can reach the interior of the hollow glass body. Thus, the diameter of an individual open passage is effective as a barrier to larger particles.

In particular in the manufacture of pharmaceutical primary packaging, glass particles up to a size of about 50 micrometers are considered harmless.

Therefore, the diameter of each individual passage can be sized to be between more than 0 and less than 50 micrometers, depending on the field of use of the hollow glass body product. The diameter is to be understood as the average width of the passage, since the cross section does not have to be strictly circular nor consistently large along the passage.

In some embodiments, the diameter of each individual passage is sized to be between more than 0 micrometers and less than 3 micrometers, such as between 1 micrometer and less than 3 micrometers, such that the diameters of the open passages in the hollow glass body product are within the stated ranges.

In this way, the adjusted or provided micrometer range-sized open passages constitute vent openings and thus a pressure equalization system allowing to prevent an undesired negative pressure from building up in the interior of the hollow glass body.

In some embodiments, the open passages exhibit a total gas flow resistance, also known as drag, of a magnitude such that with a pressure difference of 1 bar between the interior of the hollow glass body product and the exterior of the hollow glass body product, a volume flow for air is less than $2*10^{-2}$ liters/s.

The Hagen-Poiseuille law describes the volumetric flow rate per unit time for a laminar flow of a homogeneous Newtonian fluid, such as air, through a pipe of radius r and length l:

$$V = \frac{dV}{dt} = \frac{\pi r4}{8\eta} \frac{d\rho}{l}$$

with:
  η=dynamic viscosity of the fluid,
  dρ=pressure difference between the two ends of the passage.

Here, the relevant length l is given by the wall thickness of the hollow glass body product 1, the diameter of the pipe is the diameter of the passage introduced by the laser.

As the Hagen-Poiseuille law shows, the volumetric flow rate increases particularly strongly with the radius r of the hole or open passage, namely exponentially with the power of 4. Accordingly, a slow gas exchange is caused by the individual passages.

The passages are formed and their diameter is sized by laser-based irradiation of the hollow glass body. Particularly small diameters may be produced by an ultrashort pulsed laser, with laser pulses having a pulse length of less than 10 picoseconds and/or with a pulse frequency of greater than 100 kHz.

This guarantees an at least very low particle load or even a complete absence of particles and thus a high degree of freedom from contamination in the interior of the hollow glass body, which is very important, such as for use in the pharmaceutical field, in particular as a pharmaceutical container.

Consequently, even future requirements of the pharmaceutical industry regarding vent hole generation and pressure equalization including particle barrier during transport and storage can be met by preventing particles from being generated when producing vent holes and by preventing particles beyond a certain size such as 50 microns or more from penetrating from the environment into a glass container.

In this way, both particle sources are reliably excluded.

Since the first end portion and the second end portion of the outer surface of the hollow glass body are each sealed by a bottom, the hollow glass body is completely closed so that the freedom of contamination therein is preserved during the process of producing the glass body product as well as during transport or storage thereof.

Thus, with the production of hollow glass body products according to the invention including the introducing and arranging of the open passages with cross sections in the micrometer range which are effective as vent openings, pressure equalization is ensured and at the same time an ingress of unwanted particles and thus contamination of the interior of the hollow glass body thereby is reliably excluded.

Both the method provided according to the invention and the hollow glass body product provided according to the invention allow to ensure pressure equalization and a particle barrier which is of particular importance during transport and storage of the hollow glass body.

In order to prevent breakage or severing of the hollow glass body or the glass, the filamentary defects or the open passages are furthermore arranged at correspondingly large minimum intervals, depending on the thickness and the composition of the glass.

In order to ensure the mechanical strength of the hollow glass body, in particular during handling and transport, for example of glass tubes, glass tube vials, glass ampoules, glass cartridges, or glass syringes in the pharmaceutical sector, the filamentary defects and/or open passages may be arranged along the circumference of the outer surface of the hollow glass body at minimum intervals of at least 7 micrometers, such as at least 10 micrometers. This distance is measured from center to center of the passages.

An exemplary embodiment of an apparatus for producing hollow glass body products by the method of the invention may comprise a conveying device for the hollow glass body that has an outer surface with a first end portion and a second end portion, a laser-based irradiation device for generating focused laser radiation using focusing optics and a device for directing the focused laser radiation over the outer surface and for producing the plurality of spaced apart filamentary defects in a predetermined arrangement pattern in the outer surface of at least the first end portion of the hollow glass body for generating, by at least part of the filamentary defects, a plurality of open passages connecting the interior of the hollow glass body to the outer surface thereof, for sizing the diameter of each single passage in the micrometer range and for providing gaseous communication to the interior by a plurality of open passages having a diameter between more than 0 micrometers and less than 50 micrometers, in particular to produce a sufficiently large cross-sectional area for venting and/or pressure equalization, and a thermal sealing device for hot forming the hollow glass body so as to produce a hollow glass body product that has two closed ends. Optionally, a separate discharging device may be provided for the hollow glass body having the open passages, or else the removal or further transport is also accomplished by the conveying device.

The laser-based irradiation device comprises a laser with the upstream focusing optics and the directing device for stably guiding and positioning the focusing optics according to a desired arrangement pattern at the desired distance and at the desired irradiation angle relative to the outer surface of the hollow glass body. This means that the optics are displaceable in order to move and direct the laser radiation or the laser beam in a focused manner, so that the respective point of incidence of the laser beam of the laser on the outer surface of the hollow glass body to be processed can be precisely predetermined.

The optimum irradiation angle also depends on the thickness and/or the diameter of the hollow glass body and the optical properties of the material. The most favorable value for each case is determined by tests or calculations.

In some embodiments of the method for producing hollow glass body products, the producing of the filamentary defects in the outer surface of the hollow glass body is preceded or followed by a process of heat-soft separation, which may be continuous, of the hollow glass body into predetermined sections, the sections of the hollow glass body each having a first end portion and a second end portion, and each of the first and second end portions are sealed by forming a respective bottom.

In some embodiments, the separation of the hollow glass body into predetermined sections is achieved by continuous heat-soft separation, whereby sealed hollow glass body products may be obtained, without or already with venting.

For the extension of the method by the heat-soft separation of the hollow glass body into predetermined sections, the aforementioned apparatus may be supplemented as follows.

The extended apparatus may comprise a thermal sealing device in the form of a separating and sealing device for separating the hollow glass body in a thermally softened state into predetermined sections, each one having a first end portion and a second end portion each one sealed by a respective bottom. In other words, the thermal sealing device is configured here to simultaneously separate sections from the hollow glass body during the sealing, which sections then form the hollow glass body product, in particular in the form of a tube closed on both ends. In some embodiments, the hollow glass body product has a circular cross section, but this is not mandatory. Also conceivable are tubes with an elliptical or polygonal cross-sectional shape.

The separation in a thermally softened state or heat-soft separation of the hollow glass body into sections allows, in a simple way, to achieve separation without generating splinters or glass particles.

So, this method for producing hollow glass body products supplemented by the thermal separation process likewise eliminates the potential sources of unwanted particles, that is both their generation during the process of producing the hollow glass body product and their ingress from the environment into the interior of the hollow glass body.

During the heat-soft separation, the hollow glass body may be heated to temperatures much greater than the transformation temperature of the glass along a predetermined separation line, and, according to one option, the separation of the hollow glass body into the predetermined sections is accomplished by increasing the distance of adjacent sections and drawing thereby thinning the heated separation line until tearing occurs in the center of the hollow glass body thereby forming two predetermined sections, the sections each having a first end portion and a second end portion, and each of the first and second end portions are being closed due to the influence of surface tension of the glass to form a bottom.

Alternatively, the hollow glass body may be severed along the heated separation line by a shear cut thereby forming two predetermined sections, the sections each having a first end portion and a second end portion, and each of the first and second end portions are being closed due to the influence of surface tension of the glass to form a bottom.

In both cases, completely closed hollow glass bodies are produced by the continuous separation process, while the inner surface is kept free of particles.

What is achieved with the measures mentioned above is that even if particles should be present, the size of particles in the interior of the hollow glass body product may include particle sizes of less than 50 µm, such as less than 25 µm, or less than 10 µm. In this way, low contamination can be achieved, or even an exclusion of contamination by microorganisms, for example.

In some embodiments of the method for producing a hollow glass body product, in particular pharmaceutical primary packaging, part of the filamentary defects and/or of the open passages may define an individual code of the hollow glass body, with a freely selectable geometric arrangement pattern of the defects and/or open passages in the form of squares, rectangles, parallelograms, circles, ellipses, mixed shapes thereof, or 2D codes, such as variants of data matrix codes. More generally, it is therefore contemplated according to a further embodiment that the arrangement pattern of the passages or filamentary defects includes encoded information, or that the passages are introduced in such a way that their location on the hollow glass body product encodes information. This information may include technical data of the hollow glass body product, such as the type of glass, dimensions thereof, or the date of manufacture, and optionally also indications regarding errors in the glass, in particular their location.

In a hollow glass body product with pressure equalization system provided according to the invention, the open passages provided in a freely selectable geometric arrangement pattern, such as squares, rectangles, parallelograms, circles, ellipses or mixed shapes, or variants of data matrix codes, may simultaneously represent an individual code of the hollow glass body or may represent additional filamentary defects including an individual code of the hollow glass body.

In some embodiments of the method, at least part of the filamentary defects and/or of the open passages define a general or individual code including data relating to the hollow glass body. In some embodiments of the hollow glass body product, at least part of the filamentary defects and/or open passages forms a freely selectable geometric arrangement pattern defining a general or individual code of the hollow glass body, which includes or indicates information about process parameters, product specification, type of error, and/or error position. This allows obtaining important information about the origin, originality, manufacture, specific production data of the hollow glass body or the hollow glass body product, and technical data on dimensions and glass type, in particular for the purposes of tracing, further processing, identification of originality, for quality assurance and quality improvement, counterfeit protection, and/or for combatting product piracy.

Furthermore, the method for producing hollow glass body products may also be designed such that, in particular with regard to further processing, at least part of the filamentary defects and/or of the open passages define a predetermined breaking line for subsequent separation of the hollow glass body into predetermined sections, thereby also providing for low-splinter and precise separation of the hollow glass body.

A similar method for separating a portion from a sheet glass element along a designated separation line which divides the glass element into a portion to be separated and a remaining main part, in which filamentary defects are produced side by side along the separation line in the volume of the glass element, is described in International Patent Application Publication WO 2017/009149 A1.

An advantage of this method is the high stability of the predetermined breaking line produced in this way, which is stable over time and thus even tolerates moderate mechanical loads during transport and further processing without fracture growth.

Usually, the separation along the predetermined breaking line is achieved by thermal stresses, for example by local heating with a burner or by $CO_2$ laser irradiation, or by mechanical stresses.

It is known from literature that separation processes of this kind can be accomplished with low splintering. When using a laser, the process is even clean room compatible.

This separation or breaking may be performed during final processing by the hollow body manufacturer, or else during further processing of the hollow body by the customer.

Thus, the requirements of the pharmaceutical industry can be met, namely not to produce any detrimental particles, in particular particles that might fit through the cross section of the open passages and/or might lead to undesirable contamination of the interior of the hollow glass body, and that at the same time no particles can get into the interior of the hollow glass body through the vent openings and/or pressure equalization openings, or that the size of the particles is less than 50 µm, such as less than 25 µm or less than 10 µm.

A hollow glass body product with pressure equalization system specified in this regard, in particular a precursor for further processing, may comprise filamentary defects and/or open passages defining a predetermined breaking line for subsequent separation of the hollow glass body into predetermined sections.

Alternatively or cumulatively to the separation of the hollow glass body into predetermined sections along the predetermined breaking line, the filamentary defects and/or open passages may be arranged so as to define an opening in the outer surface of the hollow glass body, such as with a total diameter of the opening in the millimeter range, for example as a vent opening or as a filling opening.

Such an opening has the advantage that it can be produced without ingress of particles and could be opened only by the user, so that particle ingress during transport and/or storage can be avoided.

For implementing the method including the formation of a predetermined breaking line, the filamentary defects and/or open passages may be arranged annularly or in the form of a string along the circumference of the outer surface of the hollow glass body.

For subsequent separation of the hollow glass body into predetermined sections and/or for an opening, the hollow glass body product with pressure equalization system specified in this regard may have a predetermined breaking line of filamentary defects and/or open passages which are arranged according to an annular or string-like shape along the circumference of the hollow glass body.

In some embodiments of the method, the predetermined breaking line may form a closed line, and detachment and removal of a portion of the wall of the hollow glass body may be caused along the predetermined breaking line by a temperature and/or pressure difference in order to produce a larger opening in the outer surface of the hollow glass body. For example, in the case of a ring-shaped or annular predetermined breaking line, a circular filling opening can be produced by separating and removing a portion from the surrounding glass like a kind of plug, by cooling the portion of the wall to be detached from the surrounding wall.

In order to improve precise separation into hollow glass body sections, the filamentary defects and/or open passages defining the predetermined breaking line are arranged along the circumference of the outer surface of the hollow glass body at intervals of not more than 6 micrometers, such as of not more than 3 micrometers.

Exemplary embodiments provided according to the present invention also relate to the use of hollow glass body products that are provided according to the invention and of hollow glass body products provided according to the invention as pharmaceutical packaging or primary packaging for pharmaceutical products, or for manufacture thereof from hollow glass body products provided according to the invention, for example for producing glass tube vials, glass ampoules, glass cartridges, or glass syringes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
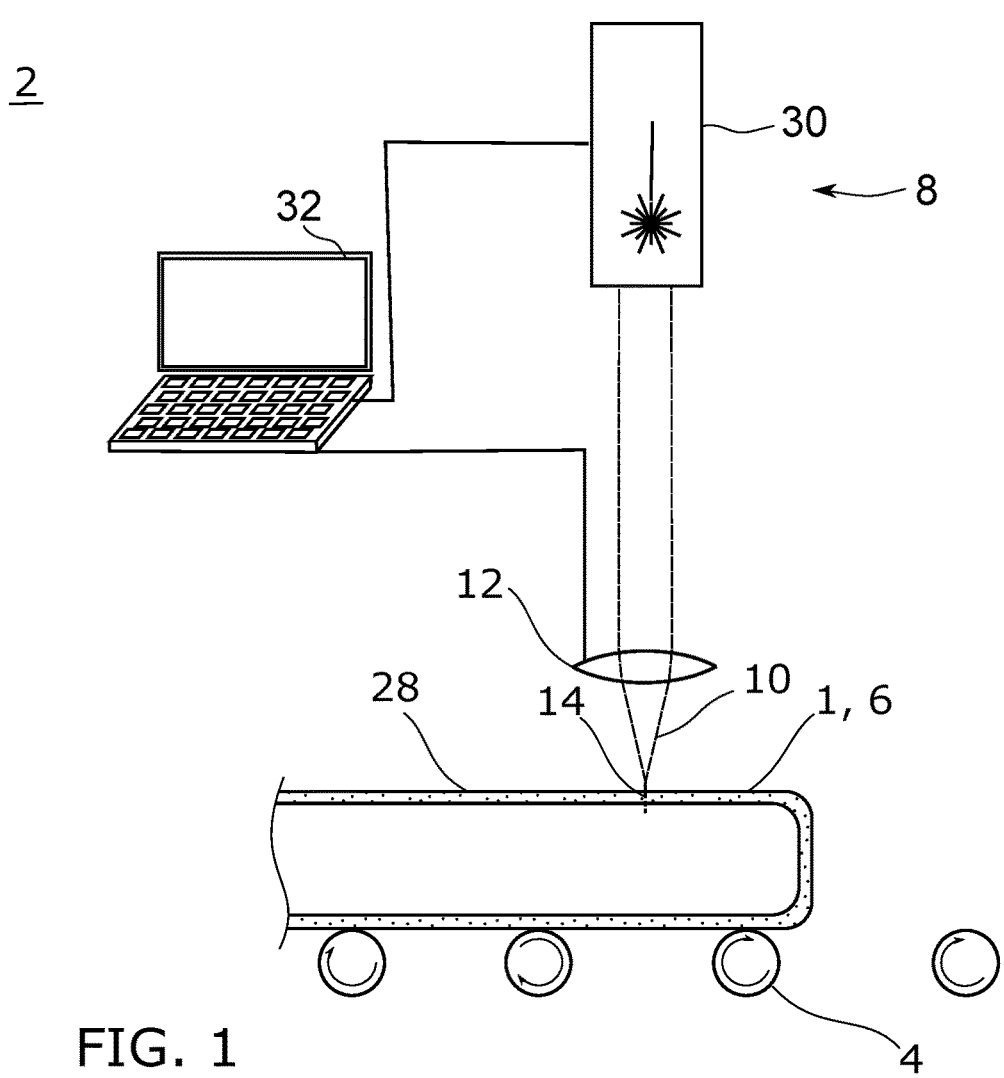
FIG. 1 is a schematic view of an apparatus for producing a hollow glass body product with filamentary defects and open passages.

FIG. 1 shows an exemplary embodiment of an apparatus 2 for producing a hollow glass body product 1, which comprises a conveying device 4 for a hollow glass body 6, a laser-based irradiation device 8 including an ultrashort pulsed laser 30 for producing focused laser radiation 10 using focusing optics 12 in order to introduce a plurality of spaced-apart filamentary defects 14 into the hollow glass body 6, at least part of which form open passages 16, and an optional directing device (not shown) for guiding the focusing optics 12.

The conveying device 4 may comprise a pulling or drawing device and may be configured to translate the hollow glass body 6 intermittingly (discontinuously) or continuously in the direction of the longitudinal axis or perpendicular thereto. At the same time, the hollow glass body 6, in particular the glass tube, may be rotated. The conveying device 4 may therefore also constitute a positioning device for selectively position the hollow glass body 6 below the laser radiation 10, or may form part of the device for directing the focused laser radiation 10 over the outer surface 28 and produce a plurality of spaced apart open passages in this way.

The apparatus 2 may also form part of a hollow glass body producing or shaping apparatus (not shown), for example for a glass tube, with the conveying device 4 feeding the hollow glass body 6 to the laser-based irradiation device 8, optionally still in the hot state.

If processing is to be performed on a moving glass, for example if the method is to be performed on a continuously produced tubular hollow glass body 6 directly when being drawn from the melt or following partial melting of a hollow glass body 6, then the laser-based irradiation device 8 and the directing device (not shown) for guiding the focusing optics 12 are configured so as to follow the movement of the hollow glass body along the conveying direction. In this way, the filamentary defects 14 and/or open passages 16 can be produced in the desired arrangement pattern during the joint movement.

In some exemplary embodiments of the apparatus 2 for producing hollow glass body products 1, the apparatus 2 may comprise an upstream thermal separation and sealing device, not shown in FIG. 1, or a thermal separation and sealing device downstream of the laser-based irradiation device 8, wherein the thermal separation and sealing device thermally separates the hollow glass body 6 into predetermined sections each having a first end portion 20 and a second end portion 22, and seals the first end portion 20 by forming a first bottom 24 and the second end portion 22 by forming a second bottom 26. When sealing during the hot forming process, a pressure difference may build up between the interior of the hollow glass body 6 and the environment, which can be equalized through the open passages 16 introduced by the laser-based irradiation device 8 until the hollow glass body product 6 is separated at a later point in time.

The laser-based irradiation device 8 can be used to introduce a plurality of spaced apart filamentary defects 14 into the hollow glass body 6 in order to form a plurality of open passages 16 connecting the interior of the hollow body 6 with the outer surface 28 thereof by at least part of the defects 14.

Laser-based irradiation device 8 comprises an ultrashort pulsed laser 30 with upstream focusing optics 12 and optionally a directing device for stably guiding the focusing optics 12 according to a desired arrangement pattern at the desired distance and at the desired irradiation angle relative to the outer surface 28 of the hollow glass body 6 in order to correctly focus and position the laser beam 10. This means that the optics 12 may be displaceable in order to move and direct the laser radiation 10 or the laser beam in a focused manner, so that the respective point of incidence of the laser beam of the ultrashort pulsed laser 30 on the outer surface 28 of the wall 27 of the hollow glass body 6 to be processed can be precisely predetermined. In this case, the directing device accordingly forms part of the device for directing the focused laser radiation 10 over the outer surface 28 in order to produce the plurality of spaced apart filamentary defects 14 in a predetermined arrangement pattern in the outer surface 28 of at least the first end portion 20 of the hollow glass body 6.

The optimum irradiation angle also depends on the thickness of the wall 27 and/or the diameter of the hollow glass body 6 and the optical properties of the material. The most favorable value for each case is determined by tests or calculations. For example, smaller angles are more advantageous for larger diameter tubes and larger angles for smaller diameter tubes.

A suitable ultrashort pulsed laser 30 for the apparatus 2 for producing a hollow glass body product 1 is a neodymiumdoped yttrium-aluminum-garnet laser with a wavelength of 1064 nanometers, which may also be operated in a frequency-doubled mode. In this case, the suitable pulse duration of a laser pulse may be shorter than 10 picoseconds. Pulse frequency may be greater than 100 kHz.

In some embodiments, an appropriately programmed computer device 32 is used to control the ultrashort pulsed laser 30 and the directing device (not shown) for focusing optics 12 and optionally also to control the conveying device 4 for positioning the hollow glass body 6 below the laser beam 10. This is in particular accomplished by importing position data, such as from a file or via a network.

In this way, a plurality of spaced apart filamentary defects 14 can be produced in a predetermined arrangement pattern in the outer surface 28, and open passages 16 can be formed which provide communication between the interior of the hollow glass body 6 and the outer surface 28 thereof, wherein the diameter of each individual passage 16 is sized to be in the micrometer range, in particular to a diameter of less than 10 micrometers, and wherein a plurality of micrometer range-sized open passages 16 provide a total cross-sectional area sufficiently large for venting and/or pressure equalization.

Figure 2:
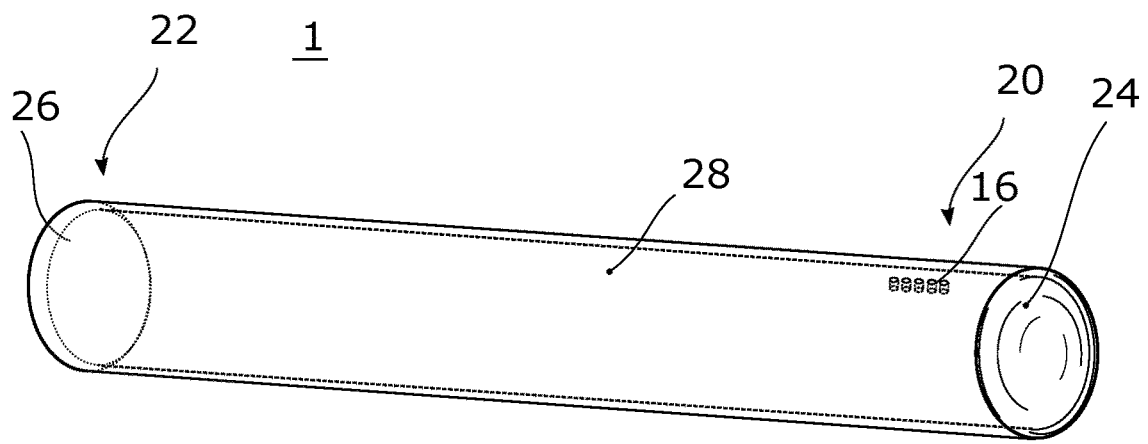
FIG. 2 shows a schematic drawing of an exemplary embodiment of a hollow glass body product provided according to the invention having introduced open passages for venting and/or pressure equalization, which may simultaneously represent an individual code.

FIG. 2 shows a view of a hollow glass body product 1 provided according to the invention having introduced open passages 16 which provide a sufficiently large cross-sectional area for venting and/or pressure equalization. More generally, without being limited to the illustrated example, in some embodiments the passages 16 are not distributed over the hollow glass body product 1, but are introduced in a grouped arrangement pattern close to each other. The passages 16 may be spaced apart by less than 1 millimeter in this case.

The hollow glass body product 1 with the outer surface 28 has a first end portion 20 and a second end portion 22, the first end portion 20 and the second end portion 22 being sealed by the first bottom 24 and the second bottom 26, respectively.

Even glass with a thickness of the wall 27 of more than 5 millimeters would be suitable for producing a passage 16 that extends through the hollow glass body 6, more generally, however, thinner glass is suitable.

Without being limited to the examples shown in the figures it is therefore suggested according to some exemplary embodiments of the invention that the hollow glass body product 1 has a thickness of the wall 27 of not more than 5 millimeters. For pharmaceutical applications, in particular for syringes or cartridges, thicknesses of the wall 27 of not more than 2.5 millimeters are usually employed.

A variety of glass compositions can be selected, as long as they are processible using a laser. For example, borosilicate glass or aluminosilicate glass are a possible option.

A plurality of spaced apart open passages 16 connecting the interior of the hollow glass body 6 with the outer surface 28 thereof are arranged along the outer surface 28, in particular in the first end portion 20 of the hollow glass body 6. A diameter of each passage 16 is sized in the micrometer range, as it can be introduced into the outer surface 28 of the hollow glass body 6 by having the ultrashort pulsed laser 30 controlled by the computer device 32 as described above, and also by controlling the directing device for the focusing optics 12 (not shown), and optionally also by controlling the conveying device 4 as a positioning device for the hollow glass body 6.

The diameter of each individual passage 16 may be greater than 0 and less than 10 micrometers, such as between more than 0 and 3 micrometers or between 1 and less than 3 micrometers.

With a plurality of micrometer range-sized open passages 16, a total cross-sectional area is obtained which is sufficiently large for venting and/or pressure equalization, and undesirable negative pressure is prevented from building up in the interior of the hollow glass body 6.

It will be apparent for a person skilled in the art how to determine the necessary number of open passages 16 defined by the filamentary defects from the cross section of the opening or diameter of an open passage 16 and the rate of pressure equalization which depends on the application. Thus, rather small open passages will be sufficient for pressure equalization during the cooling and transport of a hollow glass body over several hours.

Due to the small size of each open passage 16, the generation of particles, especially those with a critical size for penetration, can be prevented. Due to the small diameter of the open passages 16, no particles larger than the diameter of the passages 16 can reach the interior of the hollow glass body 6. Thus, the diameter of an individual open passage 16 is effective as a barrier to larger particles.

In order to ensure the mechanical strength of the hollow glass body 6, and in particular in order to prevent breakage or undesired separation of the hollow glass body 6 during handling and transport, for example of glass tubes, glass tube vials, glass ampoules, glass cartridges, or glass syringes in the pharmaceutical sector, the filamentary defects 14 and/or open passages 16 may be arranged along the circumference of the outer surface 28 of the hollow glass body 6 at minimum intervals of at least 7 micrometers or at least 10 micrometers. These distances are measured from center to center of the passages.

In the hollow glass body product 1 with pressure equalization system provided according to the invention, the open passages 16 may therefore be provided in a freely selectable geometric arrangement pattern, such as in the form of a single row array as shown in FIG. 2, and may thus simultaneously represent an individual code of the hollow glass body product 1.

Also, filamentary defects 14 may indicate errors and may thus form an "error map" on the wall 27 of the hollow glass body 6, for example, or may contain information about the location of errors by an arrangement of the passages 16 in the form of a code. In addition to information about process parameters, product specification, type of error and/or error position, this allows obtaining important information about the origin, originality, manufacture, specific production data of the hollow glass body 6 or the hollow glass body product 1, in particular for the purposes of tracing, further processing, identification of originality, for quality assurance and quality improvement, counterfeit protection, and/or to combat product piracy.

Figure 3:
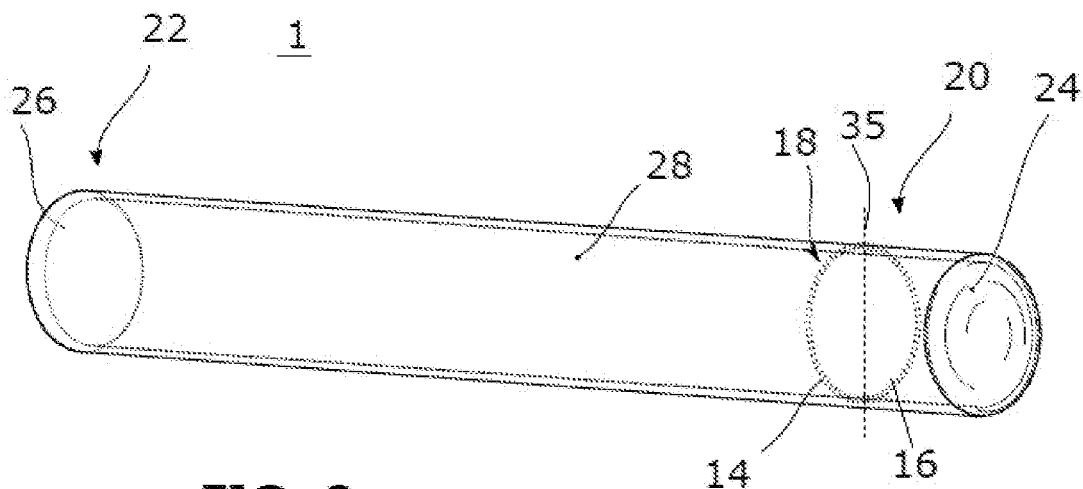
FIG. 3 shows a schematic drawing of an exemplary embodiment of a hollow glass product provided according to the invention having introduced open passages for venting and/or pressure equalization and having filamentary defects as a predetermined breaking line.

FIG. 3 shows a view of a hollow glass body product 1 provided according to the invention featuring introduced open passages 16 for venting and/or pressure equalization, for example in the form of a ring 18 extending around the circumference of the tubular hollow glass body product, as a predetermined breaking line 35 for separation of the hollow glass body 6 along this annular line at a later point in time.

Alternatively or cumulatively to the separation of the hollow glass body 6 into predetermined sections along the predetermined breaking line, the filamentary defects 14 and/or open passages 16 may also be arranged so as to define an opening in the wall 27 on the outer surface 28 of the hollow glass body 6, such as with a total diameter of the opening in a range of some or a few millimeters, for example as a vent opening or as a filling opening.

If the hollow glass body 6 in the form of a tube glass is arranged vertically, with an opening oriented upwards, the chimney effect of a vertically upward air flow can be exploited to dissipate air through the upper opening.

Figure 4:
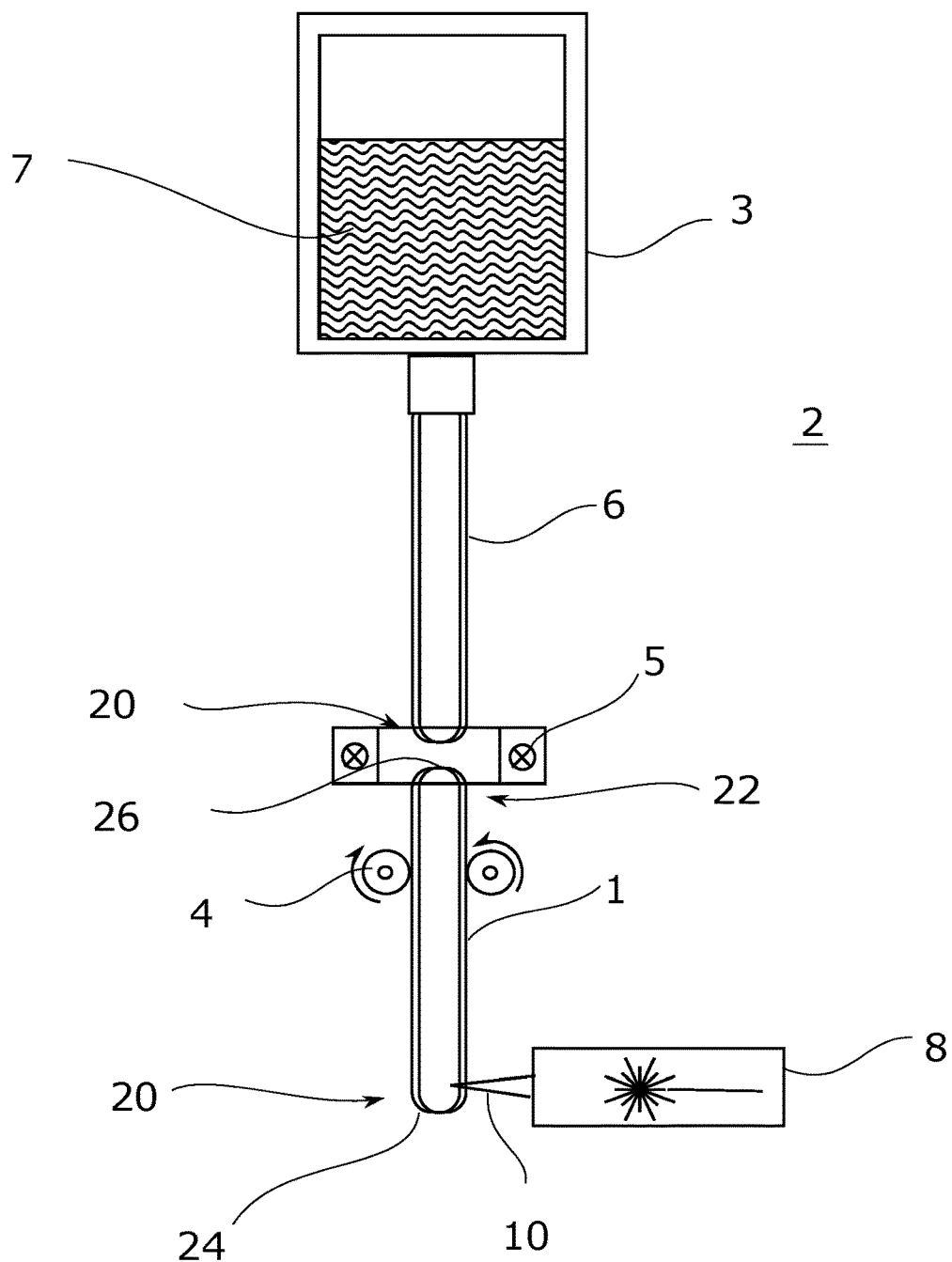
FIG. 4 is a schematic view of an exemplary embodiment of an apparatus provided according to the invention comprising an apparatus for forming hollow glass.

In some embodiments provided in accordance with the invention, the apparatus and method for producing hollow glass body products 1 may in particular comprise an apparatus 3 for producing tube glass. FIG. 4 schematically shows such an apparatus. The tube glass formed by the apparatus 3 from a melt 7 represents the hollow glass body 6 which is further processed into a hollow glass body product 1 according to the invention by the apparatus 2. For this purpose, the tube glass is fed to a thermal sealing device 5 which heat the tube glass annularly. Upon softening, the tube glass constricts itself and separates, simultaneously the severed ends are closing to forming the bottoms 24, 26. In the illustrated embodiment, the laser-based irradiation device 8 is arranged downstream of sealing device 5. However, it is likewise possible to introduce passages 16 prior to the separation into sections. According to some embodiments, the tubular hollow glass body product so obtained generally has an outer diameter in a range from 4 mm to 120 mm, such as in the range from 6 mm to 30 mm. Exemplary individual values of the outer diameter include: 6.85 mm, 8.15 mm, 10.75 mm, 10.85 mm, 12.75 mm, 14.45 mm, 14.75 mm, 16 mm, 17.05 mm, 17.75 mm, 22 mm, 22.05 mm, 22.5 mm, 24 mm, and 30 mm.

According to some embodiments, the length is in a range from 0.4 meters to 2.5 meters, such as in the range from 1.2 meters to 1.8 meters. A length of 1.5 meters is an exemplary dimension.

Exemplary wall thicknesses are in a range from 0.1 mm to 2.5 mm, such as in the range from 0.4 mm to 16 mm. Such hollow glass body products are particularly suitable for the further processing into hollow glass articles such as syringes, ampoules, and glass vials. Exemplary individual values of the wall thickness include: 0.5 mm, 0.55 mm, 0.6 mm, 0.7 mm, 0.9 mm, 1.1 mm, 1.3 mm, 1.4 mm, and 1.5 mm.

In some exemplary embodiments of the method, the predetermined breaking line consisting of passages 16 introduced next to one another may define a closed annular line, and for producing a larger opening in the outer surface 28 of the hollow glass body 6 a portion of the wall 27 of the hollow glass body 6 is detached or removed by a temperature difference and/or pressure difference. For example, a circular filling opening can be produced by separating a portion from the surrounding hollow glass body 6 like a kind of plug by cooling the portion of the wall 27 to be detached from the surrounding wall 27.

Figure 5:
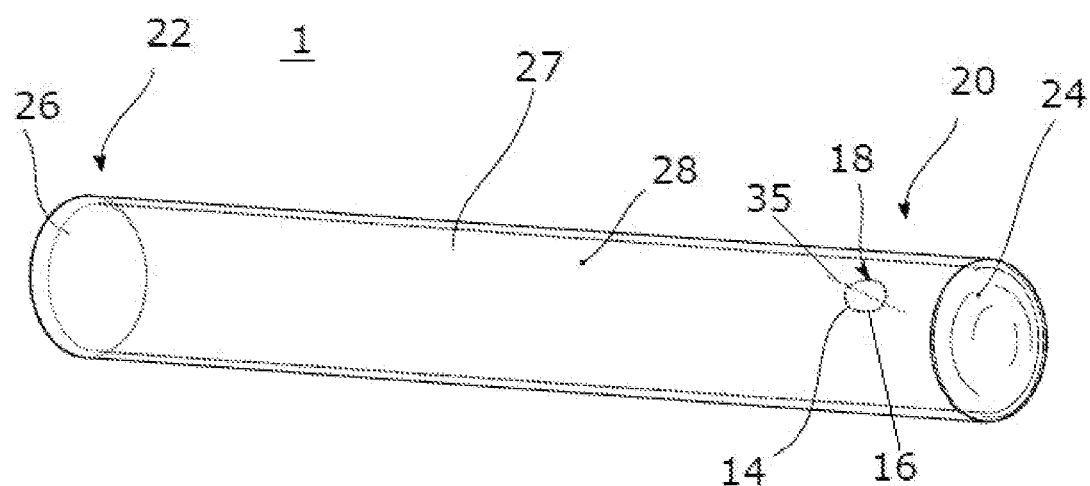
FIG. 5 shows a hollow glass body product with filamentary defects arranged along an annular line.

FIG. 5 shows a hollow glass body product 1 with such an annular predetermined breaking line 35 extending along the lateral surface of the tubular hollow glass body product 1 and being defined by passages 16 arranged side by side. Here, in contrast to the embodiment shown in FIG. 3, the predetermined breaking line 35 does not divide the hollow glass body product 1 into two axial sections so that upon severing the end face or tube end would be opened. Rather, the resulting opening is located in the lateral surface.

Figure 6:
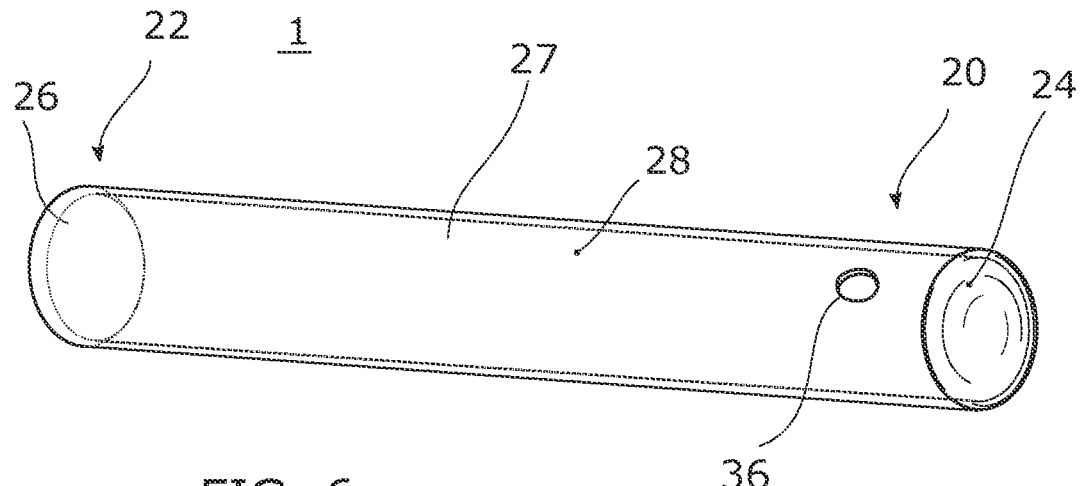
FIG. 6 shows the hollow glass body product of FIG. 5 with a portion of the wall removed along the annular line.

FIG. 6 shows the tubular hollow glass body product 1 after an opening 36 has been produced in the lateral surface of a tubular hollow glass body product 1 by detaching the portion of the wall. The annular predetermined breaking line 35 does not extend circumferentially around the lateral surface so as to divide the hollow glass body product 1 into two axial sections, but is rather introduced so as to produce an opening 36 in the lateral surface. Accordingly, at least the center of the opening 36 is spaced apart from the nearest end of the tubular hollow glass body product 1.

Figure 7:
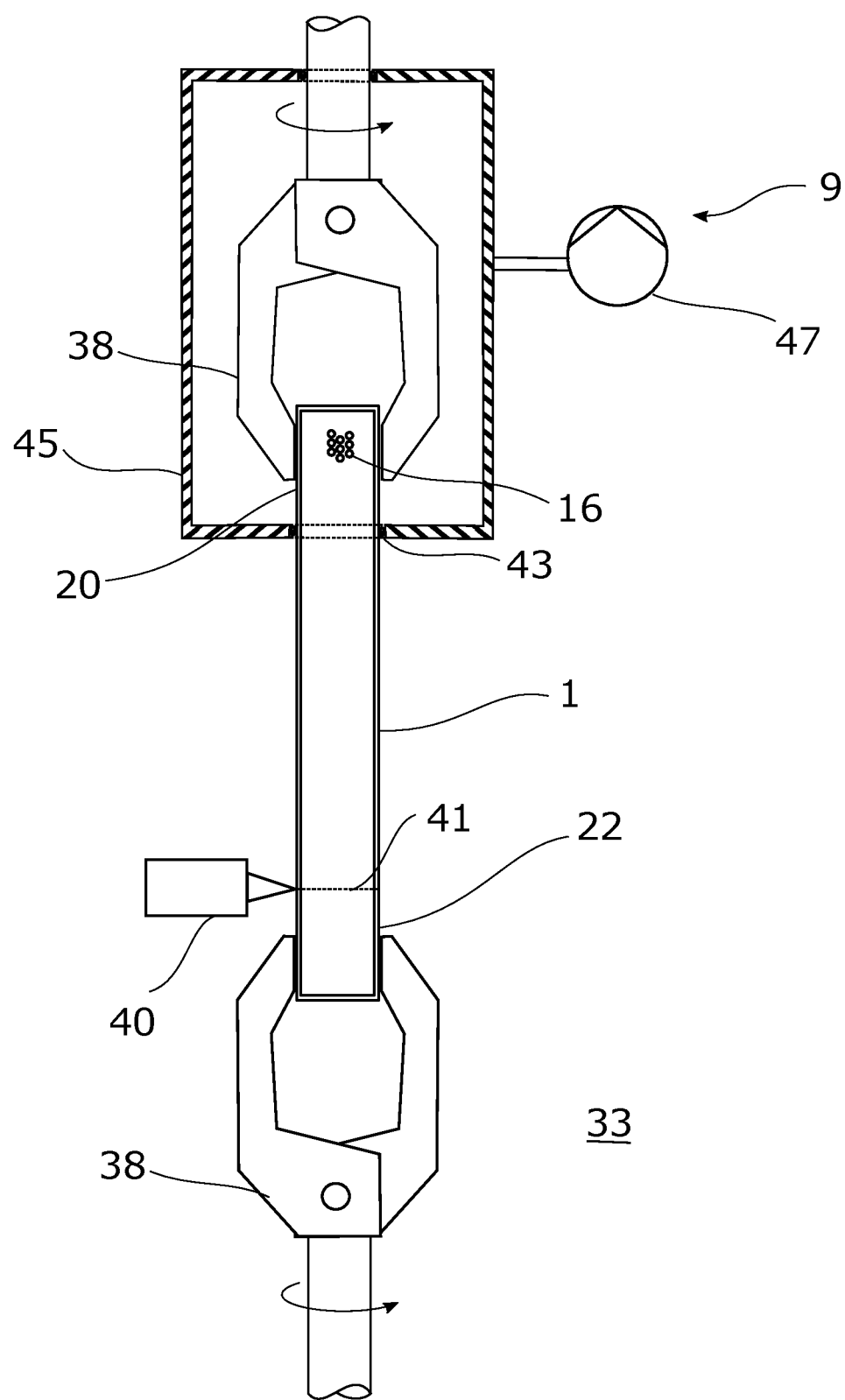
FIG. 7 shows an apparatus for further processing hollow glass body products.

FIG. 7 shows an apparatus for the further processing of hollow glass body products 1 as can be produced by the method described so far. Further processing typically aims to produce hollow glass articles such as glass tube vials, glass ampoules, glass cartridges, or glass syringes. These glass products are typically made from rather short sections of the hollow glass body product 1. At the beginning of further processing, the hollow glass body product 1 is opened. This opening may be achieved by a cold process, for example by score-and-break separation. However, glass splinters might get into the hollow glass body in this way. In order to avoid this, an apparatus and a method is provided according to exemplary embodiments of the invention and without being limited to the specific illustrated example, according to which the hollow glass body product 1 is separated for further processing, and prior to the separating, a pressure difference is generated between the interior of the hollow glass body product 1 and the exterior thereof such that the pressure inside is higher than the pressure in the exterior, and the pressure difference is generated by a gas exchange through the open passages 16, so that any particles produced by the separating are dissipated away from the hollow glass body 6 by the escaping overpressure.

For further processing, the tubular hollow glass body product 1 may be clamped in a chuck 38. The chuck 38 rotates the hollow glass body product 1 about the longitudinal axis thereof, while a scoring device 40 introduces a circumferential score 41 extending in the circumferential direction of the hollow glass body product 1. Separation along the score 41 for separating the end portion 22 may be achieved by a momentum exerted laterally onto the hollow glass body product, for example. In any case, glass particles may be produced by the tearing of the glass when the end portion is knocked off, which would then also get into the interior of the hollow glass body product and remain there. Such particles may then also be found in the articles made from the hollow glass body product. In order to avoid this, the apparatus 33 for further processing hollow glass body products 1 according to some embodiments comprises a differential pressure device 9 which is used to establish a pressure difference such that the pressure in the interior of the hollow body is greater than the ambient pressure in the exterior at the location of the score 41. For example, the differential pressure device 9 may comprise a housing 45 with an opening through which the hollow glass body product 1 is guided. The opening is sealed by a seal 43. In the illustrated example, the chuck 38 is also arranged in this housing. However, what is in particular arranged in the housing 45 is the portion of the hollow glass body product 1 in which the open passages 16 are located. Finally, a pump 47 is connected to the housing 45, which generates an overpressure in the housing 45. As a result, gas will also flow through the passages 16 into the interior of the hollow glass body product 1, and the pressure in the interior will equalize with the pressure in the housing 45. If the end portion 22 is then knocked off along the score 41, the pressurized gas will escape along the breaking line and will thereby blow off any particles that are being produced by the breaking.

Once the tubular hollow glass body product has been opened, hollow glass articles can then be produced from sections thereof by further processing, in particular by hot forming, for example vials, ampoules, or syringes.

Figure 8:
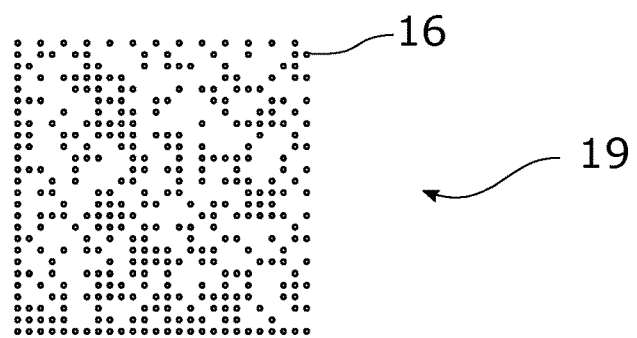
FIG. 8 shows an arrangement pattern of open passages in the form of a 2D code.

As already stated, information may furthermore be integrated into the lateral arrangement pattern of the open passages 16. For example, according to one embodiment it is generally contemplated that the passages 16 are introduced such that their lateral positions form a 2D code, for example a data matrix code. FIG. 8 shows an example of this. In the illustrated example, the 2D code 19 of this arrangement pattern of passages 16 is a data matrix code. The code may contain various information, such as relating to glass type and dimensions. By way of example, the illustrated example encodes information about a date, the glass type (borosilicate glass), the outer diameter (30 mm), and the length of the tubular hollow glass body product 1 (1500 mm). The pattern 19 may also serve as an adjusting or supporting aid upon clamping into the chuck 38 of an apparatus for further processing. However, in order to be useful for adjusting purposes or as a mark, the arrangement pattern of the passages 16 does not necessarily have to be in the form of a code. Optionally, the location of the passages on the hollow glass body product 1 might already be sufficient as a reference position for this purpose.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Hollow glass body product
2 Apparatus for producing a hollow glass body product 1
3 Apparatus for producing tube glass
4 Conveying device
5 Thermal sealing device
6 Hollow glass body
7 Melt
8 Laser-based irradiation device
9 Differential pressure device/overpressure system
10 Laser radiation
12 Focusing optics
14 Filamentary defect(s)
16 Open passage(s)
18 Ring
19 2D code
20 First end portion
22 Second end portion
24 First bottom
26 Second bottom
27 Wall
28 Outer surface
30 Ultrashort pulsed laser
32 Computer device
33 Apparatus for further processing hollow glass body products
35 Predetermined breaking line
36 Opening in 27
38 Chuck
40 Scoring device
41 Score
43 Seal
45 Housing
47 Pump

What is claimed is:

1. A hollow glass body product, comprising:
a closed glass tube comprising:
an outer surface facing an environment;
an interior surface facing an interior of the hollow glass body;
a first closed end;
a second closed end opposite the first closed end;
a plurality of spaced apart filamentary defects produced in the outer surface;
a plurality of open passages that are formed by at least some of the filamentary defects and extend through the interior surface and the outer surface to connect the interior and the environment, each one of the plurality of open passages having a diameter less than 50 micrometers; and
an individual code defined by the plurality of open passages in a geometrical pattern comprising the plurality of open passages arranged to form squares, rectangles, parallelograms, ellipses, or mixed shapes thereof.

2. The hollow glass body product of claim 1, wherein the diameter of each one of the plurality of open passages is less than 10 micrometers.

3. The hollow glass body product of claim 1, wherein the plurality of open passages comprises at least three open passages that are arranged along a circumference of the outer surface of the hollow glass body at intervals of at least 7 micrometers.

4. The hollow glass body product of claim 1, wherein some of the plurality of open passages defines a predetermined breaking line for at least one of subsequent separation of the hollow glass body into predetermined sections or for producing an opening in the outer surface of the hollow glass body as a vent opening or as a filling opening.

5. The hollow glass body product of claim 4, wherein at least two of the plurality of open passages defining the predetermined breaking line are arranged annularly or in the form of a string along a circumference of the hollow glass body.

6. The hollow glass body product of claim 5, wherein at least two of the plurality of open passages defining the predetermined breaking line are arranged along the circumference of the outer surface of the hollow glass body at intervals of not more than 6 micrometers.

* * * * *